Jan. 12, 1965 L. R. JACOBSEN 3,165,701
RADIO-FREQUENCY OSCILLATOR, AMPLIFIER AND CONVERTER
Filed Oct. 17, 1962
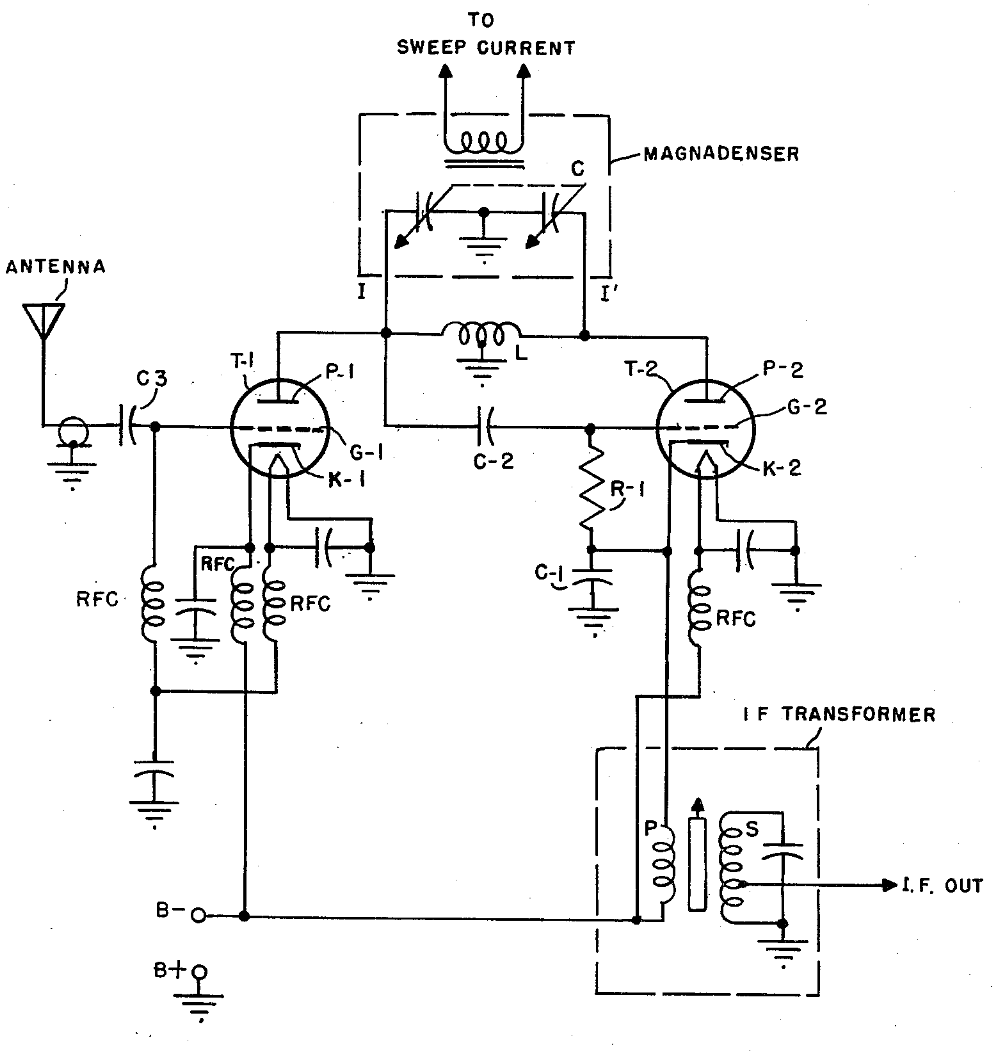
INVENTOR,
LANCE R. JACOBSEN, DECEASED
BY CHARLES E. STIMSON, ADMINISTRATOR
BY Harry M. Saragovitz
ATTORNEY.

United States Patent Office 3,165,701
Patented Jan. 12, 1965

3,165,701

RADIO-FREQUENCY OSCILLATOR, AMPLIFIER AND CONVERTER

Lance R. Jacobsen, deceased, late of San Francisco, Calif., by Charles E. Stimson, Jr., administrator, Los Angeles County, Calif., assignor to the United States of America as represented by the Secretary of the Army Filed Oct. 17, 1962, Ser. No. 232,342
3 Claims. (Cl. 325—440)

This invention relates to radio-frequncey receiving apparatus and more particularly to improved radio-frequency converters.

The design requirements for modern radio-frequency converters call for a minimum of components to accomplish a specified function without sacrificing the quality of heretofore obtainable results. Another general requirement, particularly in military gear, is to achieve minimum possible size by the elimination of bulky electromechanical elements such as filters, I-F transformers, tuning condensers, coils, etc. Thus, in prior art radio-frequency converters it was necessary to utilize at least two mechanically coupled resonant circuits including coils and condensers: one of these resonant circuits formed the input circuit to the R-F amplifier and the other the tank circuit of the local oscillator.

It is a general object of this invention to permit maximum subminaturization of high frequency converters.

It is a more specific object of this invention to reduce the number of resonant circuits required in conventional frequency converters without lowering the quality of the frequency transformation thereof.

It is another object of this invention to subminiaturize VHF and UHF panoramic receiver converters and to eliminate R-F amplifier and local oscillator tracking problems.

The features of this invention which are believed to be novel are set forth with particularity in the appended claims. The present invention itself, both as to organization and manner of operation, together with further objects and advantages thereof, may best be understood by reference to the following description taken in connection with the accompanying drawing, the single figure of which is a schematic circuit diagram of a miniaturized frequency converter having a common resonant tank circuit for the R-F amplifier and the local oscillator, and in which the mixing function is performed in the cathode circuit of the oscillator tube.

In the embodiment shown, the radio-frequency converter comprises two tridoes T–1 and T–2 having their respective plates P–1 and P–2 connected to the input terminals I–I′ of a resonant L-C tank circuit. Cathode K–2 of the oscillator tube T–2 is connected to the grounded tap on coil L through a bypass condenser C–1. Grid G–2 is connected through feedback condenser C–2 to the upper terminal I of coil L. Bias resistor R–1 connects grid G–2 with cathode K–2. The B— terminal is connected through the primary winding P of an I-F transformer to cathode K–2, and through a radio-frequency choke (RFC) to cathode K–1. The B+ terminal is applied through the grounded tap of coil L to plates P–1 and P–2. The receiving antenna is connected through condenser C–3 to the input grid G–1 of the R-F amplifier tube T–1. Coil L of the tank circuit is tuned by a magnetically controlled capacitor produced by Hoffman Laboratories and whose trade name is "The Hoffman Magnadenser." This capacitor is fed a sweeping votage to sweep the oscillator through a range of frequencies as well as to tune it. All other components, such as radio-frequency chokes and bypass condensers shown in the schematic drawing, are conventionally connected and need not be specifically identified.

In operation, the input radio frequency signals from the antenna are applied to the grid G–1 of the R-F amplifier tube T–1. The L-C tank circuit appears as a relatively high "Q" impedance to the plate of tube T–1 and provides an appreciable degree of selectivity to the frequency at which it is resonant. When the amplified radio-frequency currents flow in the tuned circuit, a voltage drop develops across the winding of coil L which increases propotionately along its turns. Thus, if the left end terminal I is positive at some instant, the right end terminal I′ will be negative at the same instant, and the point at which the center tap is connected on the winding will be at an intermediate potential. The amount of positive feedback required to sustain oscillations in the local oscillator tube T–2, and the amount of plate load impedance for the R-F amplifier tube T–1 depend on the exact position of the tap on coil L. If the tap is too near to terminal I the plate load impedance will be too low; if the tap is too near to terminal I′ the feedback will be out of phase to sustain oscillations. Maximum feedback and a satisfactory plate load impedance are obtained when the tap is placed near the center of the coil.

The feedback condenser C–2 and the bias resistor R–1 provide a proper bias voltage for the local oscillator tube T–2. During the part of the cycle in which the grid is positive with respect to the cathode, electrons will be attracted to the grid G–2, and, since they are blocked off by condensers C–2 and C–1, they will develop a self bias across resistor R–1. The amount of bias thus obtained is equal to the grid current multiplied by the resistance of R–1. It is desirable to select a low resistance value for R–1 and thereby reduce the operating efficiency of the oscillator.

The R-F amplifier tube T–1 is operated with zero bias on the grid electrode thereof. The resonant L-C tang circuit appears as a relatively high "Q" circuit to the plate of the R-F amplifier and provides a certain degree of selectivity for the frequency to which it is tuned. The incoming signals from the antenna are amplified in tube T–1 and appear simultaneously in the common L-C tank circuit with the currents developed therein by the oscillator tube T–2.

The amplified R-F currents are very nearly in phase with the oscillator currents developed in the resonant tank circuit and, therefore, drive the oscillator stage into more efficient operation. The reason for the in-phase addition of the amplified signal currents to the oscillator signals in the L-C tank circuit can be mathematically shown as follows:

If the incoming signals have, for example, a frequency of 300 mc., the local oscillator will be tuned to 300 minus 0.455 mc. (the intermediate frequency of the receiver) and the phase difference $\phi$ will be:

$$\phi=\frac{300}{360\times 0.455}=\frac{1}{.546}=1.83^\circ$$

This means that for all practical purposes, the amplified incoming signals from the antenna appear to be in phase with the local oscillator signals and will reinforce each other in the cathode circuit of the oscillator. Both types of signals will flow through the low impedance winding P of the intermediate frequency transformer. As was stated previously, the oscillator stage is designed to operate inefficiently by selecting a low value for the resistance of R–1. Since this oscillator inefficiency is reduced by the fact that the amplified incoming signals are almost in phase with the oscillator signals, the overall efficiency of the converter is not diminished.

However, since the local oscillator stage is an inherently nonlinear device and is operated inefficiently, excellent mixing is obtained in the low impedance winding P of the I-F transformer between the amplified incoming signals and the signals generated by the local oscillator. The mixing efficiency of the converter is very high because both types of signals flow directly through the primary winding P of the I-F transformer.

The difference frequency currents flowing through the primary winding P may be resonated in the transformer secondary winding S in a conventional manner. Capacitor C–1 is selected to be effective as a bypass capacitor for VHF frequencies without having sufficient reactance to appear as a shunting I-F path for the 455 kc. difference frequency. The sum of the amplified incoming R-F and oscillator currents in the converter may be ignored since both the oscillator tank and the I-F circuits present a very low impedance to such a high sum frequency.

In one embodiment of this invention, tubes T–1 and T–2 were Sylvania Type 5904 having a 45 ma. filament, and a design center of 26.5 volts D.C. for both the filament and anode voltage. Their Gm in micro-mhos is 4700 with an amplification factor of 20. These tubes have satisfactorily performed at frequencies up to 500 megacycles. Their suitability for very high frequency operation is due to the fact that the input, output and grid-to-plate capacitances are in the order of only 2 micro-microfarads. The value of R–1 in this circuit was about 10 kilo-ohms. The relatively low value of R–1 has the effect of reducing the operating efficiency of the oscillator, for reasons explained in greater detail above. C–2 is selected large enough to have a low reactance value over the operating frequency range of the oscillator. A value of 50 micro-microfarads was found to be very adequate. Although certain specific numerical values have been suggested, it should be obvious that any other type tubes and component values can be used without departing from the scope of the invention as recited in the claims.

It was found that the amount of oscillator radiation of the converter of this invention was not greater than the radiation which prevails in a conventional type converter utilizing a separate tank circuit for the R-F amplifier. This is perhaps due to the fact that in most receivers the R-F and oscillator stages are combined at a common point in the mixer stage, thereby providing an oscillator voltage path back to the plate of the R-F amplifier tube.

While the present converter exhibits relatively small radiation, it possesses greater sensitivity than a conventional converter utilizing the same components but having a second tank circuit. The greater sensitivity and mixing efficiency is obtained in this converter, because, unlike the converter with a separate tank circuit, it is free of tracking errors and of energy losses caused by the voltage drop across the coupling capacitor which is required in a converter with a separate tank circuit. Moreover, the modulation of the local oscillator signals by the incoming R-F signals produces essentially in-phase mixing in the oscillator stage and therefore effects an increase in the total R-F gain. Hence, the circuit of the present invention operates more efficiently with one tank circuit than conventional converters with two tank circuits. Also the novel arrangement of components herein allows the mixing function to be performed in the cathode circuit of the oscillator stage, thereby eliminating the need for a separate mixing stage.

The subminiaturized converter of this invention is especially suitable for panoramic receivers. Since the input circuit of R-F tube T–1 is broadly tuned, this converter can be swept over wide bands directly by magnetically sweeping the common L-C tank circuit. The sweeping function can be performed from a distance by merely controlling the amount of current sent into the control winding of the "Magnadenser." In the prior art panoramic receivers, a separate sweeping oscillator stage was usually required to sweep the outcoming intermediate frequencies from the converter.

The converter of this invention is, therefore, an extremely compact unit capable of performing the same functions as conventional converters having double the number of tuning stages and additional sweeping oscillators. Moreover these functions are accomplished herein more efficiently, since the elimination of unnecessary components reduces losses; and more conveniently, since the sweeping of the receiver is effected directly upon the common tank circuit without the need of a sweeping oscillator. This is especially important in subminiaturized equipment.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A radio-frequency converter including an antenna for receiving radio-frequency signals; a first electron-discharge device coupled to said antenna for amplifying the received radio-frequency signals; a second electron-discharge device to act as a local oscillator; and L-C tank circuit having a tap maintained at R-F ground; means for coupling said L-C tank circuit to the electron collecting electrodes of said first and said second discharge devices; means for electromagnetically sweeping said local oscillator; means for feeding back radio-frequency energy from said L-C tank circuit to said second discharge device; and means connected to the electron emitting electrode of said second electron-discharge device for deriving a difference frequency between said radio-frequency signals and the signals generated by said local oscillator.

2. A radio-frequency oscillator amplifier circuit including two vacuum tubes each having at least a cathode, a grid and an anode; an antenna; means for coupling the antenna to the grid of the first of said tubes; and L-C tank circuit comprising an inductance coil and a capacitance; means for connecting said L-C tank circuit to the plates of said tubes; means for feeding back electromagnetic energy from said tank circuit to the grid of the second of said tubes; an intermediate-frequency transformer; and means for connecting the primary winding of said intermediate-frequency transformer in the cathode circuit of the second of said tubes.

3. A radio-frequency converter including an antenna for receiving radio-frequency signals, means for coupling said antenna to a first discharge device; an inductance-capacitance resonant circuit; a second discharge device connected to act as a local oscillator; means for coupling said resonant circuit to the electron collecting terminals of said first and second discharge devices; means for electromagnetically varying the capacitance of said resonant circuit; means for feeding back electromagnetic energy from said resonant circuit to the input circuit of said second discharge device; and means coupled to the electron emitting electrode of said second discharge device for obtaining a difference frequency between the received radio-frequency signals and the signals generated by said local oscillator.

References Cited by the Examiner

FOREIGN PATENTS 789,067 1/58 Great Britain.

DAVID G. REDINBAUGH, *Primary Examiner.*